(12) United States Patent
Albert et al.

(10) Patent No.: US 8,136,258 B2
(45) Date of Patent: Mar. 20, 2012

(54) ABSOLUTE POSITION SENSOR WITH SERIAL READING

(75) Inventors: Laurent Albert, Montigny-le-bretonneux (FR); Christophe Dang Van Nhan, Villejuif (FR)

(73) Assignee: Renault S.A.S., Boulogne Billancourt (FR)

( * ) Notice: Subject to any disclaimer, the term of this patent is extended or adjusted under 35 U.S.C. 154(b) by 0 days.

(21) Appl. No.: 12/678,394

(22) PCT Filed: Sep. 16, 2008

(86) PCT No.: PCT/FR2008/051656
§ 371 (c)(1),
(2), (4) Date: May 25, 2010

(87) PCT Pub. No.: WO2009/053566
PCT Pub. Date: Apr. 30, 2009

(65) Prior Publication Data
US 2010/0281699 A1    Nov. 11, 2010

(30) Foreign Application Priority Data
Sep. 20, 2007  (FR) ...................................... 07 57740

(51) Int. Cl.
*G01D 5/347*    (2006.01)
(52) U.S. Cl. .......................................... 33/1 PT; 33/706
(58) Field of Classification Search .................. 33/1 PT, 33/706, 707, 708
See application file for complete search history.

(56) References Cited

U.S. PATENT DOCUMENTS

| 4,158,509 | A  | * | 6/1979  | Rieder et al. ..................... 33/707 |
| 5,279,044 | A  | * | 1/1994  | Bremer ........................... 33/706 |
| 7,089,678 | B2 | * | 8/2006  | Novak et al. ..................... 33/706 |
| 2002/0024336 | A1 |   | 2/2002  | Desbiolles et al. |
| 2004/0216320 | A1 | * | 11/2004 | Birrer et al. ..................... 33/708 |
| 2007/0186431 | A1 | * | 8/2007  | Mittmann et al. ............... 33/707 |

FOREIGN PATENT DOCUMENTS

| EP | 1 167 927     | 1/2002 |
| FR | 2 532 761     | 3/1984 |
| GB | 2 226 720     | 7/1990 |
| WO | 2006/056941 A2 | 6/2006 |

OTHER PUBLICATIONS

Office Action issued May 5, 2011, in Chinese Patent Application No. 2008801072955, (with English-language translation).

* cited by examiner

*Primary Examiner* — G. Bradley Bennett
(74) *Attorney, Agent, or Firm* — Oblon, Spivak, McClelland, Maier & Neustadt, L.L.P.

(57) ABSTRACT

An absolute position sensor with serial reading, that includes at least one detector capable of detecting transitions in a target pattern present on a member mobile relative to the detector. The sensor includes a shift register capable of storing a predetermined number of consecutive data from the detector, and a mechanism comparing the value of the register to a set of predetermined values each corresponding to a position of the detector relative to the target pattern.

20 Claims, 3 Drawing Sheets

ABSOLUTE POSITION SENSOR WITH SERIAL READING

TECHNICAL FIELD

The invention relates to the field of metrology, in particular metrology suited to absolute-position measurement.

Its subject is more specifically an absolute-position sensor which finds a particular application in the automobile field.

PRIOR ART

Usually, absolute-position sensors have many applications, whether it be measuring a given setpoint by the movement of a member the position of which is representative of said setpoint, or else in the context of closed-loop control for which the position of a movable member is the result of a movement caused by an actuator.

Many solutions have already been proposed for measuring an absolute position. One of the simplest solutions consists in using a variable-resistance potentiometer, the cursor of which is directly linked with the position to be measured. Measuring the electric resistance between the terminals of the potentiometer and its cursor is sufficient for deducing an absolute position. However, such a solution has drawbacks inherent in a measurement with contact. The friction that occurs is the source of wear which adversely affects the reliability of the sensor.

It is for this reason that contactless measurement solutions have been developed in order to achieve acceptable robustness. Various contactless measurement technologies use different physical phenomena, of the optical or magnetic type for example. Usually, the contactless measurements aim to take a measurement of the digital type, as opposed to analog measurements on which the potentiometer-based solutions mentioned above rely.

To do this, the sensor comprises one or more detectors capable of detecting the transitions of a target pattern present on a member that can move relative to the detector. The detection of these transitions makes it possible to generate a binary signal which is then processed by a specific algorithm.

Amongst the simplest and most common solutions, detectors are known that are associated with a target pattern consisting of a plurality of pulses, evenly spaced, so that the detector makes it possible to count the pulses that pass along and thus to measure the relative movement between the detector and the member supporting the target pattern. This also presupposes knowing the direction of movement. In order to know an absolute position with this type of sensor which measures essentially a relative movement, it is necessary to implement a procedure of immobilization relative to an absolute reference. This reference may consist of an end-of-travel stop, or an index placed in a precise location of the travel. This immobilization procedure is usually burdensome and complex to put in place and all the more so if it has to be repeated every time a detection fault occurs. Therefore, such an immobilization procedure is difficult to achieve on an automobile when it is in motion.

To enhance the robustness of this measurement, it has been proposed to increase the number of detectors and therefore of the target patterns inside one and the same sensor. In order to do this, and as described in documents GB-2 226 720 and EP-0 561 416, a plurality of detectors are installed in parallel, and are sensitive to the transitions on several distinct target patterns. The robustness may be enhanced by using target patterns that are designed to generate Gray or similar codes in all of the detectors.

Such solutions are satisfactory in that they allow position measurements that are robust and have no immobilization procedure. On the other hand, these solutions require a high number of detectors, and therefore cause an increase in the cost of the sensor and above all a deterioration of their reliability. These drawbacks are all the greater if a high resolution of the sensor is sought, which results directly in an increase in the number of detectors.

One problem that the invention proposes to solve involves providing a measurement solution that has a resolution similar to the existing solutions, but by using a much more limited number of detectors.

SUMMARY OF THE INVENTION

The invention therefore relates to an absolute-position sensor which comprises at least one detector capable of detecting the transitions of a target pattern present on a member that can move relative to this detector. The mobility of the member that can move relative to the detector means a possibility of relative movement, meaning that the detector can be fixed and the movable member is moving, or vice versa, that the detector moves in front of the member supporting the target pattern, or else that the detector and the movable member both move.

According to the invention, this sensor is characterized in that it comprises a shift register capable of registering a predetermined number of successive items of information originating from said detector, and means for comparing the value of said register relative to a set of values predetermined according to said target pattern and representative of an absolute position of the detector relative to the member supporting the target pattern.

In other words, the invention consists in using only one target pattern the transitions of which are acquired successively by a shift register. The value of this register therefore adopts, on a predetermined number of bits, a fraction of the target pattern. Through a comparison of this value with the fractions of patterns of the same length that can be observed over the whole target pattern, it is possible to deduce the absolute position of the detector relative to the member supporting the target pattern.

It will be noted that this comparison is possible only from the moment when all of the bits of the shift register have been supplied. The position measurement is therefore not available immediately on initialization. This drawback is however very largely compensated for by the fact that the sensor comprises only one detector of the target pattern, which greatly improves its reliability and its cost price.

In practice, the shift-register clock can be supplied in various ways.

Therefore, in a first embodiment, the sensor also comprises a first additional detector, capable of detecting the periodic transitions of a first additional pattern, the period of which is equal to the smallest period of the target pattern. In other words, a second detector makes it possible to detect pulse patterns placed in cohesion with the main target pattern. Therefore, each of these pulses allows the bits of the shift register to be offset at the maximum frequency of movement of the main target pattern.

In a second embodiment, the target pattern may itself be a biphase code, making it possible to extract therefrom a signal at the maximum frequency of variation of the items of information of the target pattern. Various types of biphase code may be employed, and in particular codes of the Manchester type or two-frequency constant-phase code, also known as F2F code.

In a third embodiment, the sensor may also comprise a second additional detector, capable of detecting the periodic transitions of a second additional pattern, phase-shifted relative to the first additional pattern. This phase shift may be chosen arbitrarily because the two additional patterns are not in phase opposition, in order to make it possible to detect a direction of movement. In practice, the phase shift that is the simplest and most reliable to employ is a quarter-period phase shift.

Such a sensor can be used in various applications to measure either a linear movement or a rotation. In the first case, the target pattern is rectilinear and most usually designed to be traveled in a reciprocating manner. In the second case, the target pattern is written in a continuous circular loop.

As an application, it is possible to cite the measurements of absolute linear position of a steering rack, or else the absolute angular position of a steering wheel.

BRIEF DESCRIPTION OF THE FIGURES

The way of embodying the invention, and the advantages derived therefrom will clearly emerge from the description of the following embodiments, supported by the appended figures, in which.

DETAILED DESCRIPTION OF THE INVENTION

Figure 1:
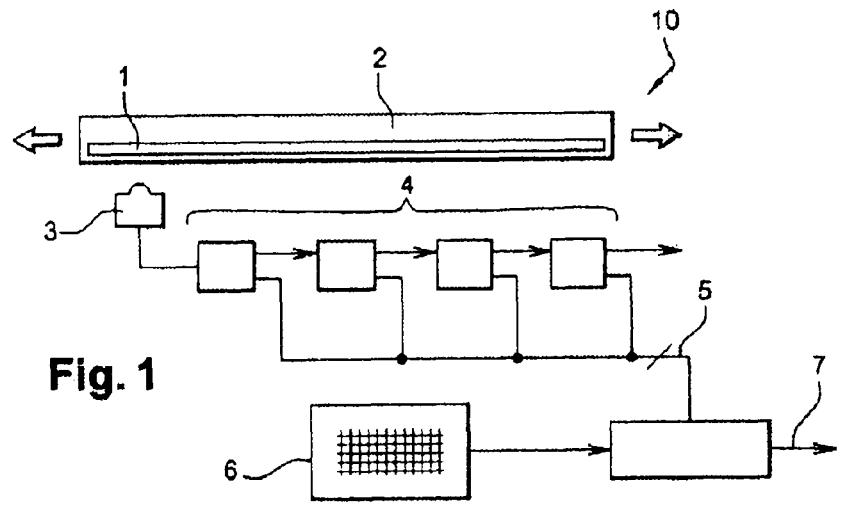
FIG. 1 is a general diagram illustrating the operation of the invention.

In a general manner and as illustrated in FIG. 1, the invention is based on the use of a target pattern 1 present on a member 2 that can move relative to the detector 3. This detector 3 therefore detects the transitions of the target pattern 1, and feeds a shift register 4, the outputs 5 of which are analyzed so that they can then be compared with a table of references 6 and indicate the absolute position 7 thus measured.

Figure 2:
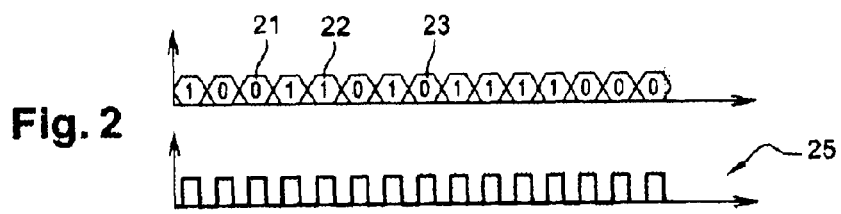
FIG. 2 is a diagram illustrating the patterns present according to a first embodiment of a sensor.
Figure 3:
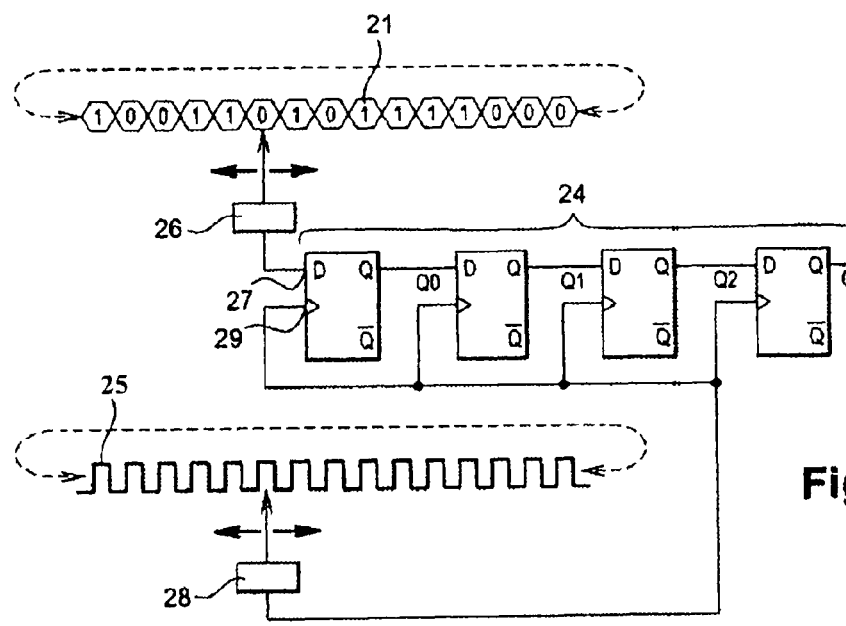
FIG. 3 is a simplified diagram illustrating the operation of the first embodiment of the sensor.

In the first embodiment illustrated in FIGS. 2 and 3, the sensor 10 comprises a serial target pattern 21, including various binary items of information 22, 23 which may, for example, be generated by a Linear Feedback Shift Register or LFSR. This LFSR consists of a given number N of cascaded flip-flops forming a shift register and an "exclusive OR" gate taking its inputs on one or more flip-flop outputs, and the output is injected as an input of the shift register. This LSFR generates a very precise sequence of binary codes, in the manner of a counter. By a judicious choice of the inputs of the exclusive OR gate, it is possible even to maximize the number of possible codes. This target pattern 21 is associated with a second pulse pattern 25, the period of which is identical to the period of the target pattern.

A first detector 26 reads the serial target pattern 21 and feeds the input 27 of a shift register of N bits (where N=4 in FIG. 3), for a serial target pattern consisting of $2^N$ bits. A second detector 28 reads the pulse target pattern 25 and feeds the clock 29 of the shift register.

The code contained in the shift register 24 gives an item of absolute position information, when a movement of at least N bits has occurred in the same direction, on condition that the direction of movement is known. This embodiment is particularly suitable for systems in which the movement is commanded and controlled so that the direction of movement is thus known.

Figure 4:
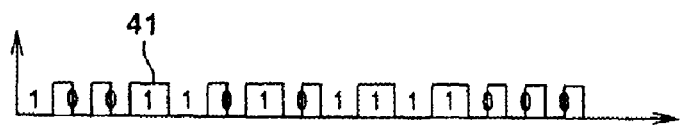
FIG. 4 is a diagram illustrating the patterns present according to a second embodiment of a sensor.
Figure 5:
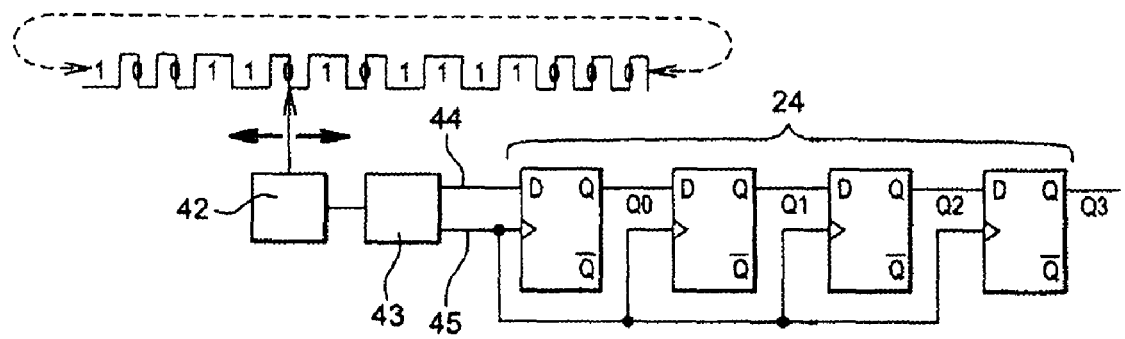
FIG. 5 is a simplified diagram illustrating the operation of a second embodiment of the sensor.

In a second embodiment illustrated in FIGS. 4 and 5, a single serial target pattern 41 is used which itself contains a pulse pattern. To do this, the code of the target pattern is a biphase code. Different types of code may be employed, in particular codes of the Manchester type, in which a "1" is represented by a rising edge, and a "0" is represented by a falling edge. Another type of suitable biphase code is illustrated in FIG. 4. It is a code of the F2F type or also two-frequency coherent-phase code, in which a "1" is represented by a half-period of a square-wave signal of frequency F, and a "0" is represented by a period of a square-wave signal of frequency 2F. In this case, a single detector 42 is necessary to read the target pattern 41. A biphase decoder 43 makes it possible separately to extract the binary information 44 representative of the absolute position and the clock signal 45 which feeds the shift register 24.

The code contained in the shift register gives an item of absolute position information, when a movement of at least N bits has occurred in the same direction, on condition that this direction of movement is known, and the approximate speed of movement which makes it possible to correctly extract the pulse pattern. This embodiment has a particular advantage when the speed of movement is known and controlled, which makes it possible to increase the robustness and efficacity of detection.

Figure 6:
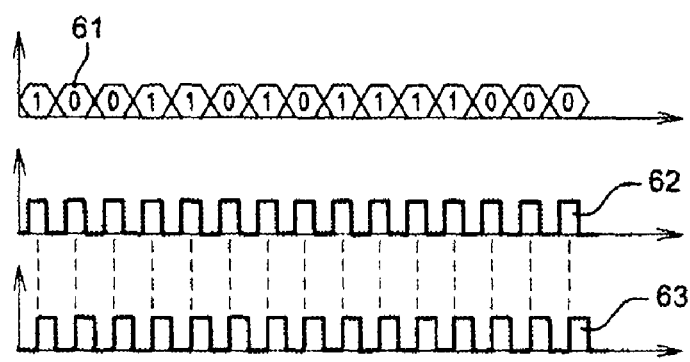
FIGS. 6 and 7 are simplified diagrams illustrating the operation of the third embodiment of the sensor.
Figure 7:
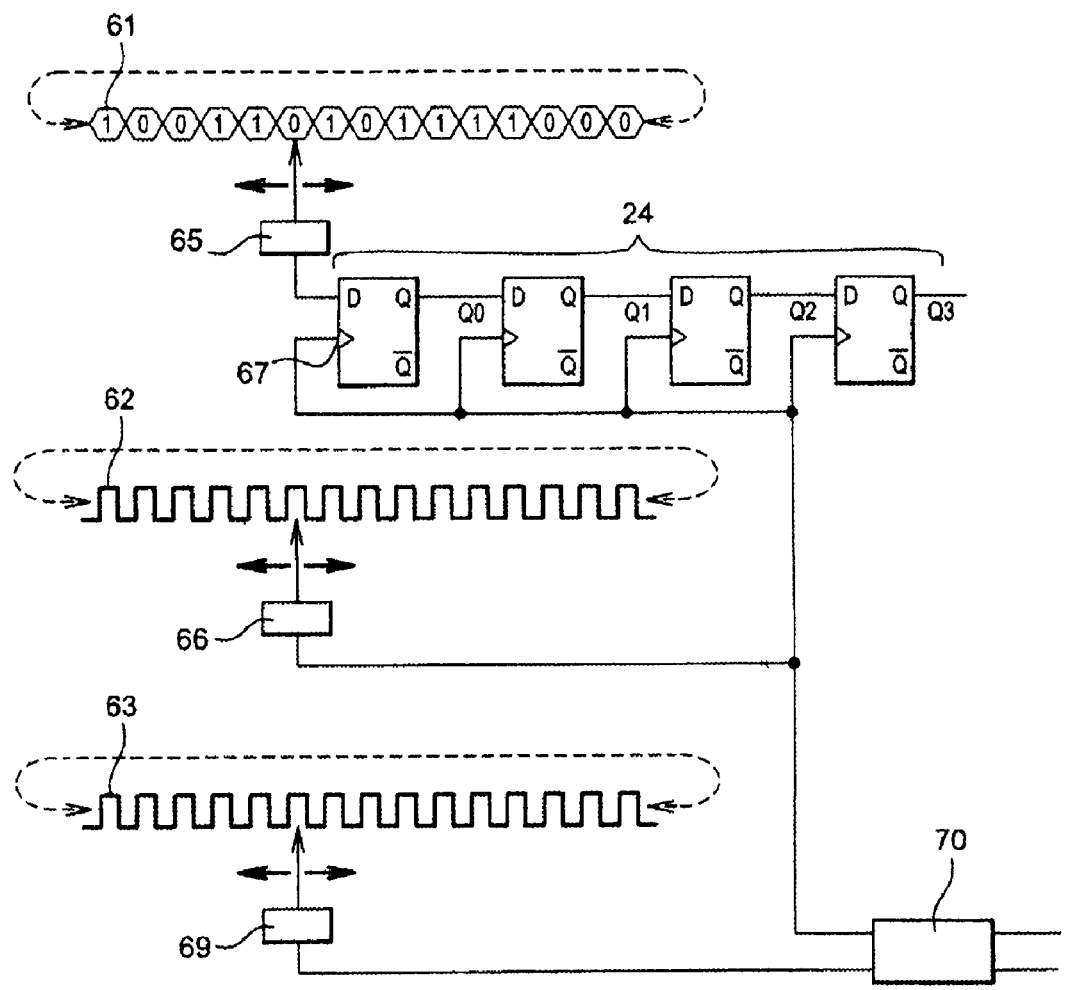

In a third embodiment illustrated in FIGS. 6 and 7, a serial target pattern 61 and two additional patterns 62, 63 in the form of a square-wave signal, in phase quadrature are used.

A first detector 65 reads the serial target pattern 61, and feeds the input of a shift register 24 of N bits, for a serial target pattern comprising $2^N$ bits. A second detector 66 reads the first square-wave signal target pattern 62 and feeds the clock 67 of the shift register 24. A third detector 68 reads the second square-wave target pattern 63 which is in phase quadrature with the first square-wave signal pattern 62. This third detector 69 feeds, jointly with the output of the second detector 66, a direction-detection device 70, capable of deducing an item of information from the direction of movement. In a particular form, this detection device 70 can confirm that a movement of at least N bits has occurred in the same direction and thus confirm that the shift register has been properly fed, and that the position measurement is pertinent.

This embodiment is particularly suitable for situations in which the direction of movement is not known a priori or can frequently change.

It emerges from the foregoing that the sensor according to the invention has many advantages and in particular that of requiring a very limited number of detectors, since they operate in certain embodiments with a single detector. The robustness and the cost price of the sensors are therefore particularly attractive.

The invention claimed is:

1. An absolute-position sensor with serial reading comprising:
   at least one detector configured to detect transitions of a target pattern present on a member that can move relative to the detector;
   a shift register configured to register a predetermined number of successive items of information originating from the detector introduced into only one end of the shift register for all directions of relative motion between the target pattern and the detector; and means for comparing a value of the register relative to a set of predetermined values each corresponding to a position of the detector relative to the target pattern.

2. The sensor as claimed in claim 1, further comprising a first additional detector configured to detect periodic transitions of a first additional pattern, the period of which is equal to a smallest period of the target pattern.

3. The sensor as claimed in claim 2, further comprising a second additional detector configured to detect periodic transitions of a second additional pattern phase-shifted from the first additional pattern.

4. The sensor as claimed in claim 2, wherein the phase shift is a quarter of a period.

5. The sensor as claimed in claim 2, wherein the signal originating from the additional detector supplies a clock of the shift register.

6. The sensor as claimed in claim 1, wherein the target pattern is a biphase code.

7. The sensor as claimed in claim 6, wherein the biphase code is of the Manchester type or two-frequency coherent-phase code.

8. The sensor as claimed in claim 1, wherein the target pattern is written linearly on a member that supports the target pattern.

9. The sensor as claimed in claim 8, wherein the target pattern is written in a circular manner looped on a member that supports the target pattern.

10. The use of a sensor as claimed in claim 1 for measuring absolute linear position of a motorized steering rack.

11. The use of a sensor as claimed in claim 1 for measuring angular position of a vehicle steering wheel.

12. An absolute-position sensor with serial reading comprising:
    a single detector configured to detect transitions of a single target pattern present on a member that can move relative to the detector, the single target pattern being coded to include a clock signal;
    a shift register configured to register a predetermined number of successive items of information originating from the detector introduced into only one end of the shift register for all directions of relative motion between the target pattern and the detector; and
    a device configured to compare a value of the register relative to a set of predetermined values each corresponding to a position of the detector relative to the target pattern.

13. The sensor as claimed in claim 12, wherein the single target pattern is a biphase code.

14. The sensor as claimed in claim 13, wherein the biphase code is of the Manchester type or two-frequency coherent-phase code.

15. The sensor as claimed in claim 12, wherein the target pattern is written linearly on a member that supports the target pattern.

16. The sensor as claimed in claim 12, wherein the target pattern is written in a circular manner looped on a member that supports the target pattern.

17. An absolute-position sensor with serial reading comprising:
    at least one detector configured to detect transitions of a target pattern present on a member that can move relative to the detector;
    at least one detector configured to detect periodic transitions of a first additional pattern, the period of which is equal to a smallest period of the target pattern;
    at least one detector configured to detect periodic transitions of a second additional pattern phase-shifted from the first additional pattern;
    a shift register configured to register a predetermined number of successive items of information originating from the detector introduced into only one end of the shift register for all directions of relative motion between the target pattern and the detector; and
    a device configured to compare a value of the register relative to a set of predetermined values each corresponding to a position of the detector relative to the target pattern.

18. The sensor as claimed in claim 17, wherein the phase shift is a quarter of a period.

19. The sensor as claimed in claim 17, wherein the target pattern is written linearly on a member that supports the target pattern.

20. The sensor as claimed in claim 17, wherein the target pattern is written in a circular manner looped on a member that supports the target pattern.

* * * * *